INVENTOR.
ALFRED G. TONNESSEN
BY
Allan Ratner

INVENTOR.
ALFRED G. TONNESSEN
BY
Allan Ratner

INVENTOR.

ALFRED G. TONNESSEN

BY

Allan Ratner

INVENTOR.
ALFRED G. TONNESSEN
BY
Allan Ratner

INVENTOR.
ALFRED G. TONNESSEN
BY
Allan Ratner

INVENTOR.
ALFRED G. TONNESSEN
BY
Allan Ratner

INVENTOR.
ALFRED G. TONNESSEN
BY
Allan Ratner

United States Patent Office 3,453,421

Patented July 1, 1969

3,453,421

READOUT SYSTEM BY SEQUENTIAL ADDRESSING OF COMPUTER ELEMENTS

Alfred G. Tonnesson, Hamilton Garden, N.J., assignor to Electronic Associates Inc., Long Branch, N.J., a corporation of New Jersey Filed May 13, 1965, Ser. No. 455,470
Int. Cl. G06g *7/28;* G06j *1/00*
U.S. Cl. 235—150.4 18 Claims

ABSTRACT OF THE DISCLOSURE

A scanning system is provided for a computing system having a plurality of computing elements located at a predetermined position in a switching matrix. The system sequentially scans the outputs of the computing elements by reading out an output if a computing element is present at an address, or stepping to a next address if a computing element is not located at an address.

This invention relates to electronic computing apparatus and more particularly to providing sequential readout analog computing apparatus.

A general purpose analog computer is comprised of a plurality of analog computing elements, each of which performs a single mathematical operation. The analog computer may be used to simulate a dynamic system problem since selected analog computing elements obey laws similar to the fundamental laws which govern the dynamic system. In order to simulate the behavior of a particular dynamic system, a program is written and differing analog computing elements are connected together by means of patching in accordance with that program.

In order to provide a convenient means for patching the computing elements, many general purpose analog computers use patch boards having a plurality of holes which may be patched together by patch cords separated into groups. Each group of holes represents a particular one of the computing elements and is adapted to be connected to its corresponding computing element. However, in usual practice, less than the total possible number of comuting elements are connected to their respective holes. After the computing elements have been interconnected by means of the patch cords, the computer operator may operate the computer to obtain a result.

It has heretofore been desired to obtain a printed record of the condition of each of the computing elements sequentially and also to record the conditions of particular ones of the computing elements. Such recording has been taken at different times during the computation. For example, such a printed record of the computing element conditions may be taken before the computation run as an initial check, during the computation run as an intermediate check, and at the end of the computation run as a final condition check.

In prior analog computers stepping switch systems have been used to provide a sequential read out of the computing elements and also to read out the conditions of particular ones of such elements. These stepping switch systems have been added to the computers as separate units and the larger the computer the more stepping switches were required. In operation of such systems the output of each computing element is applied to an individual contact defining an address of a stepping switch which sequentially applies those outputs to a readout device such as a printing device. However, such stepping switch systems have left something to be desired as they would print nonexistent computer element addresses as well as a valid address since a readout was obtained for each stepping switch contact. In addition, reliability has been a problem with such systems, as a result of their being many series and multiple contacts. Further problems were slowness in speed and high cross-talk or cross-coupling which resulted from the inherent closeness of the contacts of the stepping switch and the necessarily long conductors connecting the computer elements to the stepping switch contacts. Further, as a result of the length of the conductors to the computing elements such elements were capacitive loaded whether or not readings were being made.

Accordingly, an object of the present invention is a switch system for providing read out of computing elements which does not utilize stepping switches and largely overcomes the enumerated limitations of the prior art devices.

Another object of the invention is the sequential addressing of computer elements in which a readout is only made at an address at which a computing element is located.

In accordance with the present invention, there is provided a sequential scanning system having a plurality of computing elements located at predetermined addresses in the computer. Counter means produce address signals corresponding to a predetermined sequence of addresses and a matrix is provided having a plurality of intersections corresponding to the sequence of addresses. Each computing element is connected to the matrix at its respective address. In operation, signals are applied to sequentially select each of the addresses of the matrix to read out in turn the output of the computing elements. However, a readout is taken only if a computing element is located at a selected address. If a computing element is located at a selected address, then a time duration is provided for the readout and then the counting means is stepped to the next sequential address. On the other hand, if a computing element is not located at a selected address, then the counter means immediately steps to the next sequential address.

In this manner, a readout is taken only at an address at which a computing element is located and no readout is taken at the other addresses. The system operates at high speed, has low cross-talk, is not capacitive loaded and utilizes electronic components rather than stepping switches.

In a preferred form of the invention, each of the computing elements includes relay means operable to connect the output of its respective computing element to a readout device. The matrix has at least two groups of drive line conductors with one of the group of conductors crossing the other group to form intersections of the matrix. Each intersection corresponds to a differing one of the addresses and each relay means is connected at an intersection corresponding to the address of its respective computing element. Energizing means sequentially applies energizing signals to each of the addresses of the matrix to actuate the relay means located at that selected address.

In carrying out the invention in one form thereof, a desired one of the addresses may be selected and the output of the computing element located at that address may be read out. Specifically, the desired address is manually entered into a keyboard and the counting means is utilized to store that address. Energizing signals are applied to the corresponding relay means located at that address and the output of its respective computing element is read out.

For further objects and advantages of the invention, and for a more detailed discussion of its component parts and its manner of operation, reference is to be had to the following description taken in conjunction with the accompanying drawings in which.

Figure 2:
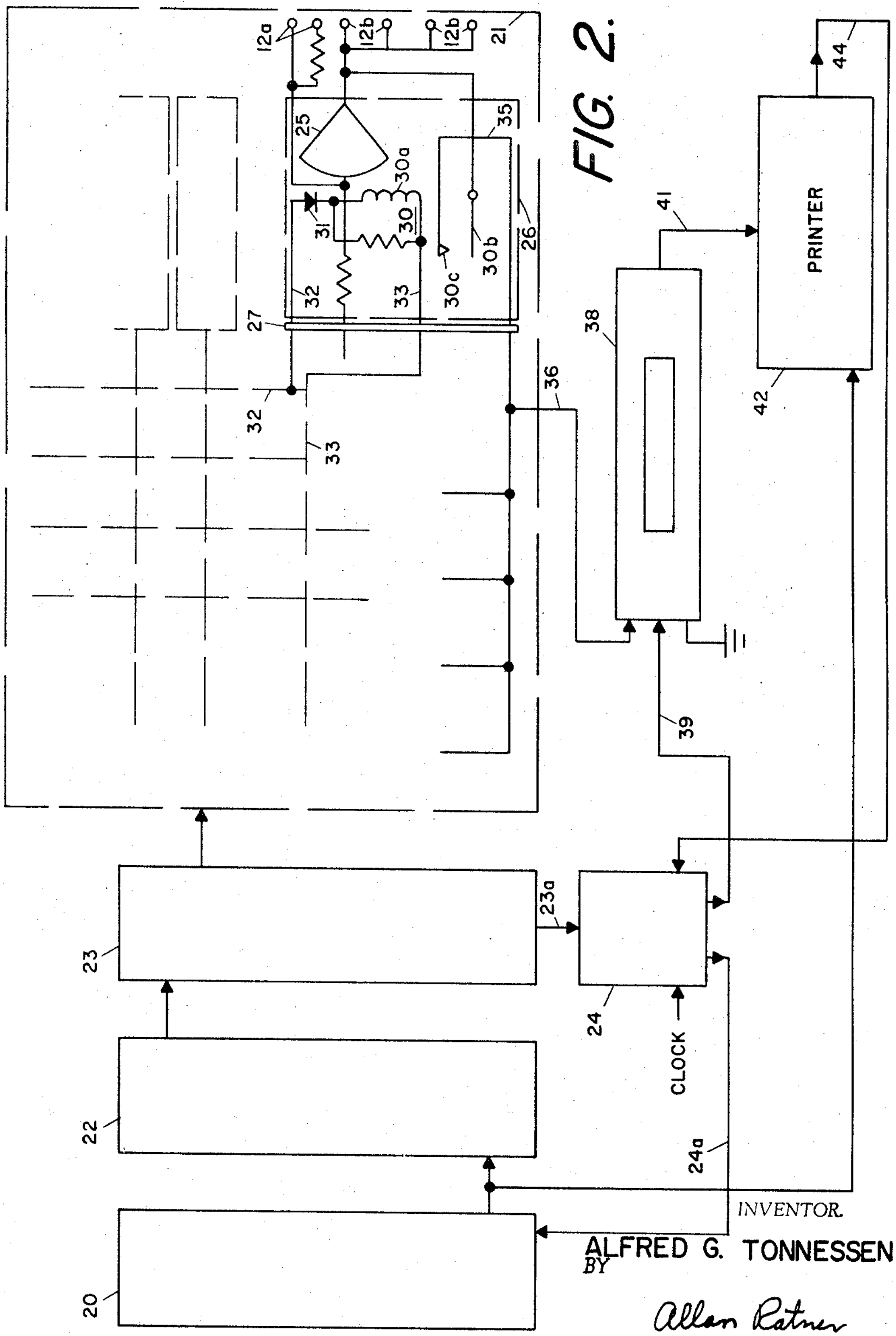
Figure 3:
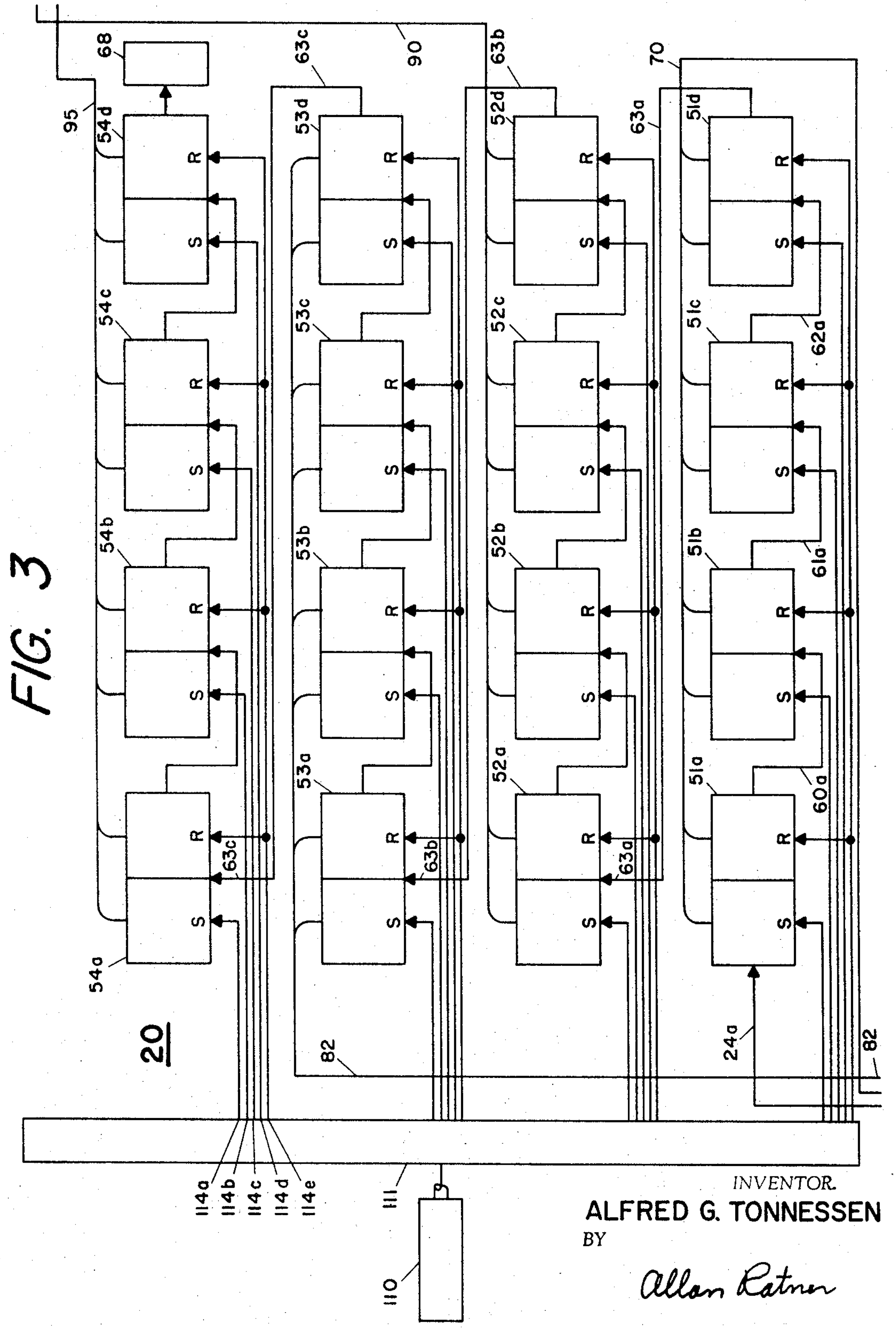
Figure 4:
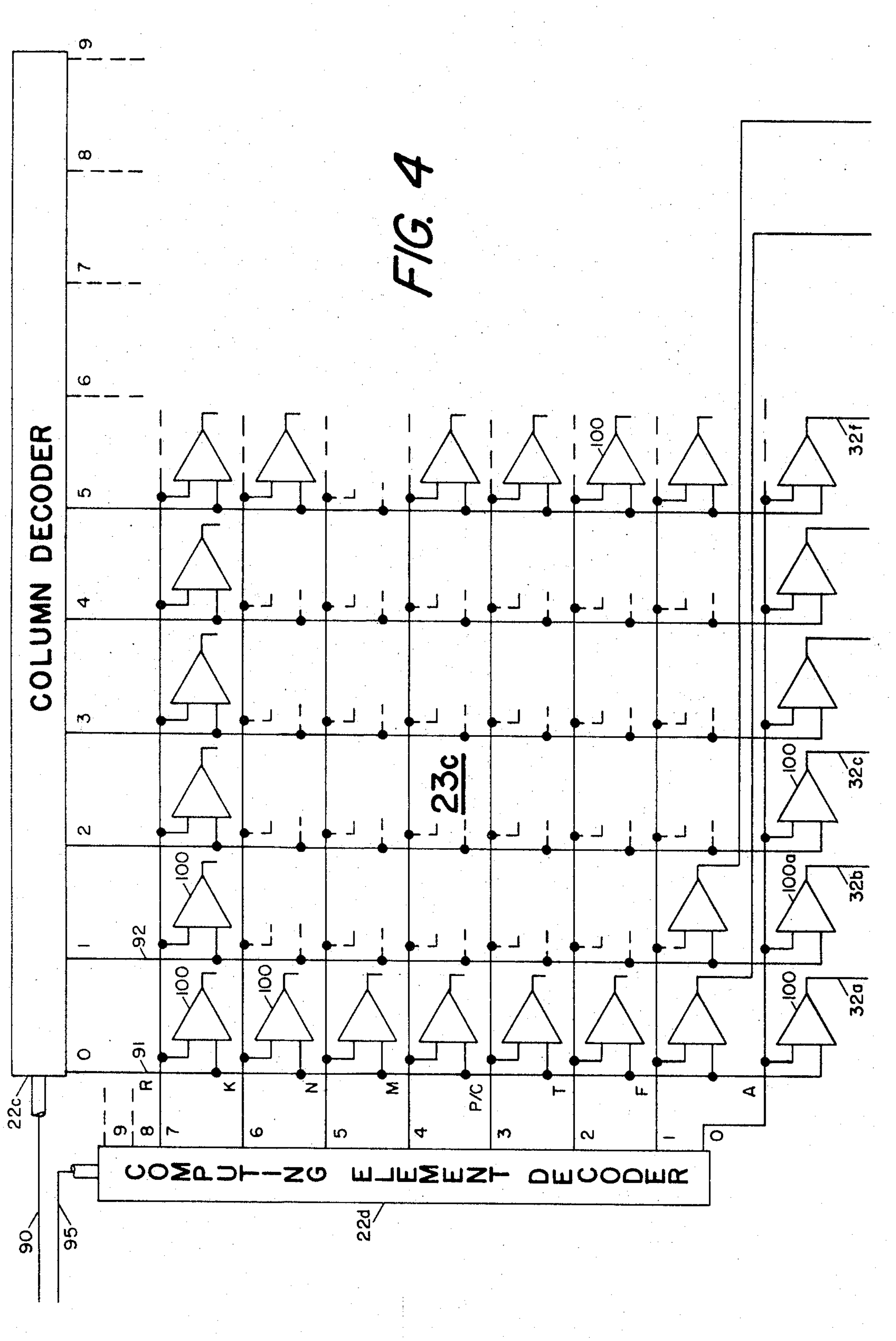
Figure 5:
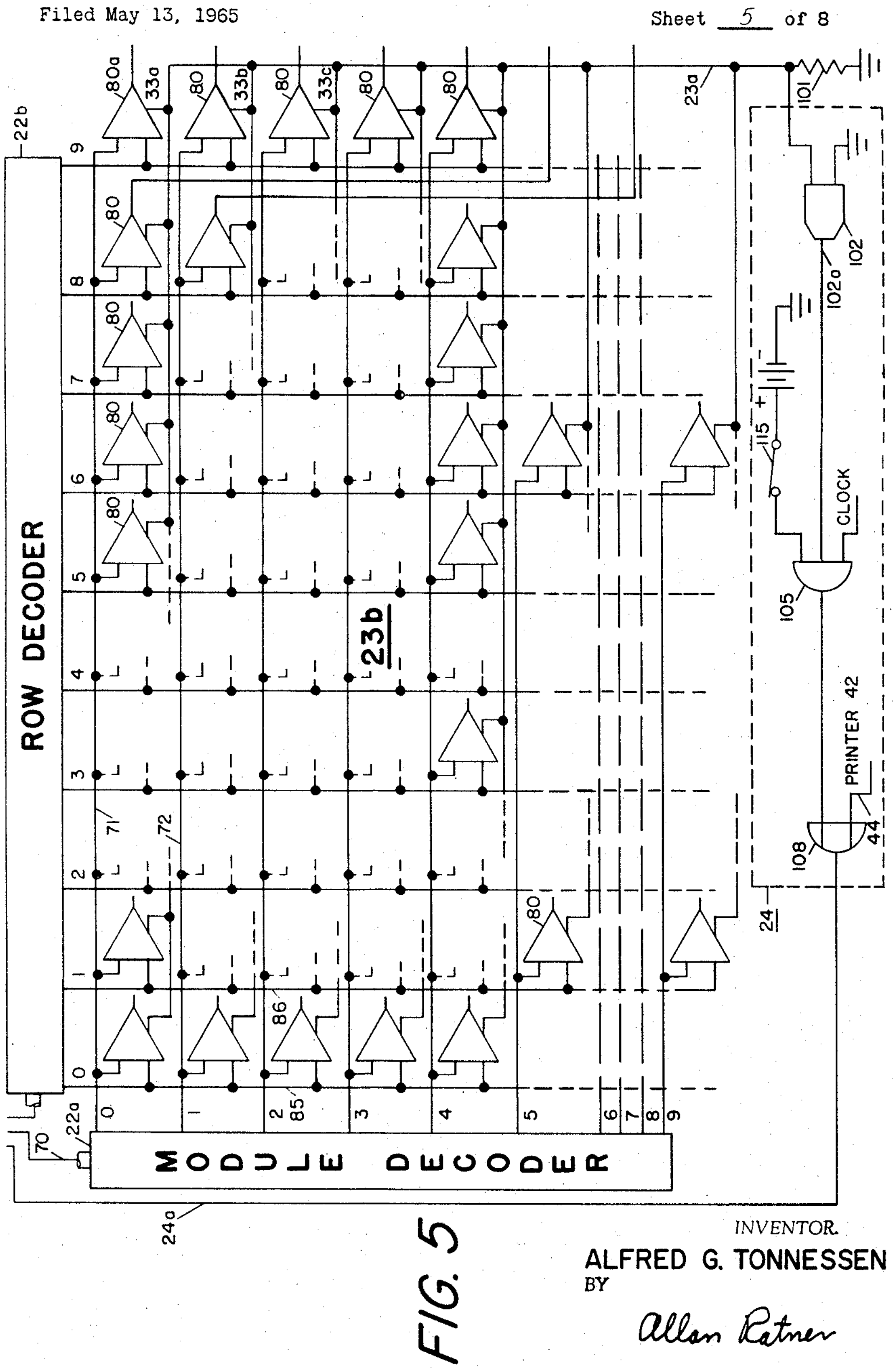
Figure 6A:
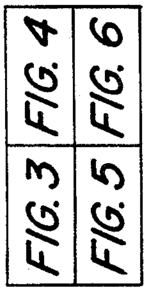
Figure 6:
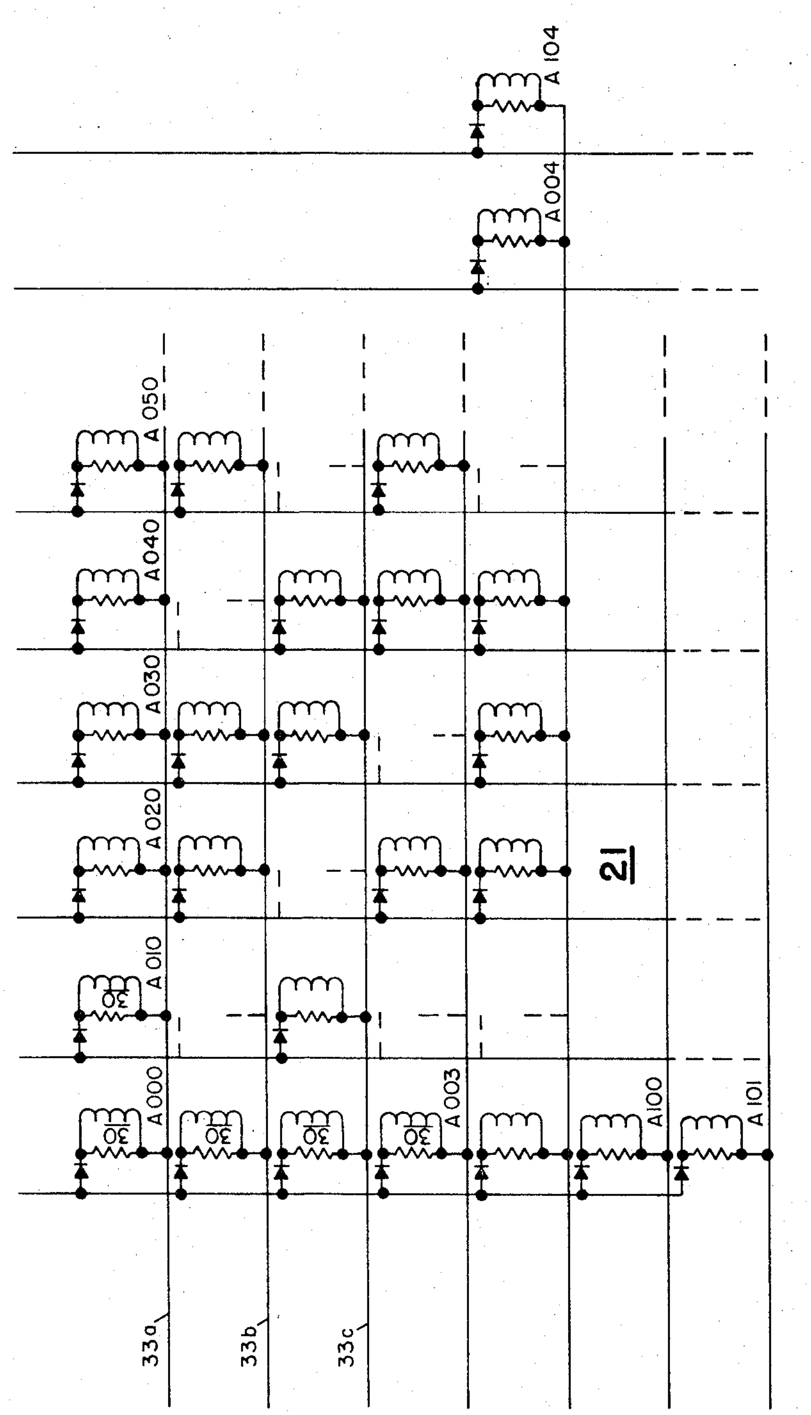
Figure 7:
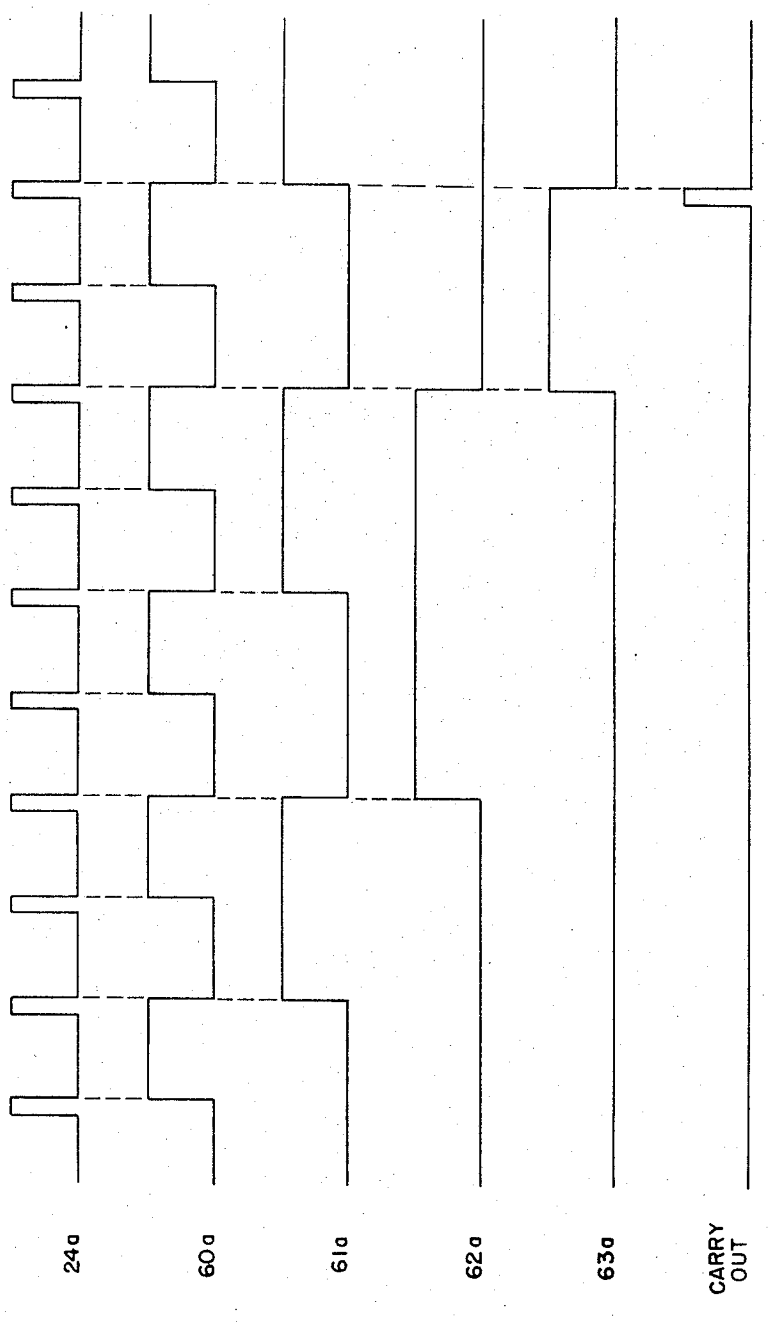

FIG. 2 schematically illustrates in block diagram form a readout system for an analog computer of the present invention;

FIGS. 3–6 taken together schematically illustrate in detail the circuits appearing in block form in FIG. 2;

FIG. 6A illustrates the manner in which FIGS. 3–6 may be taken together;

FIG. 7 illustrates waveforms useful in analyzing the invention; and

Figure 8:
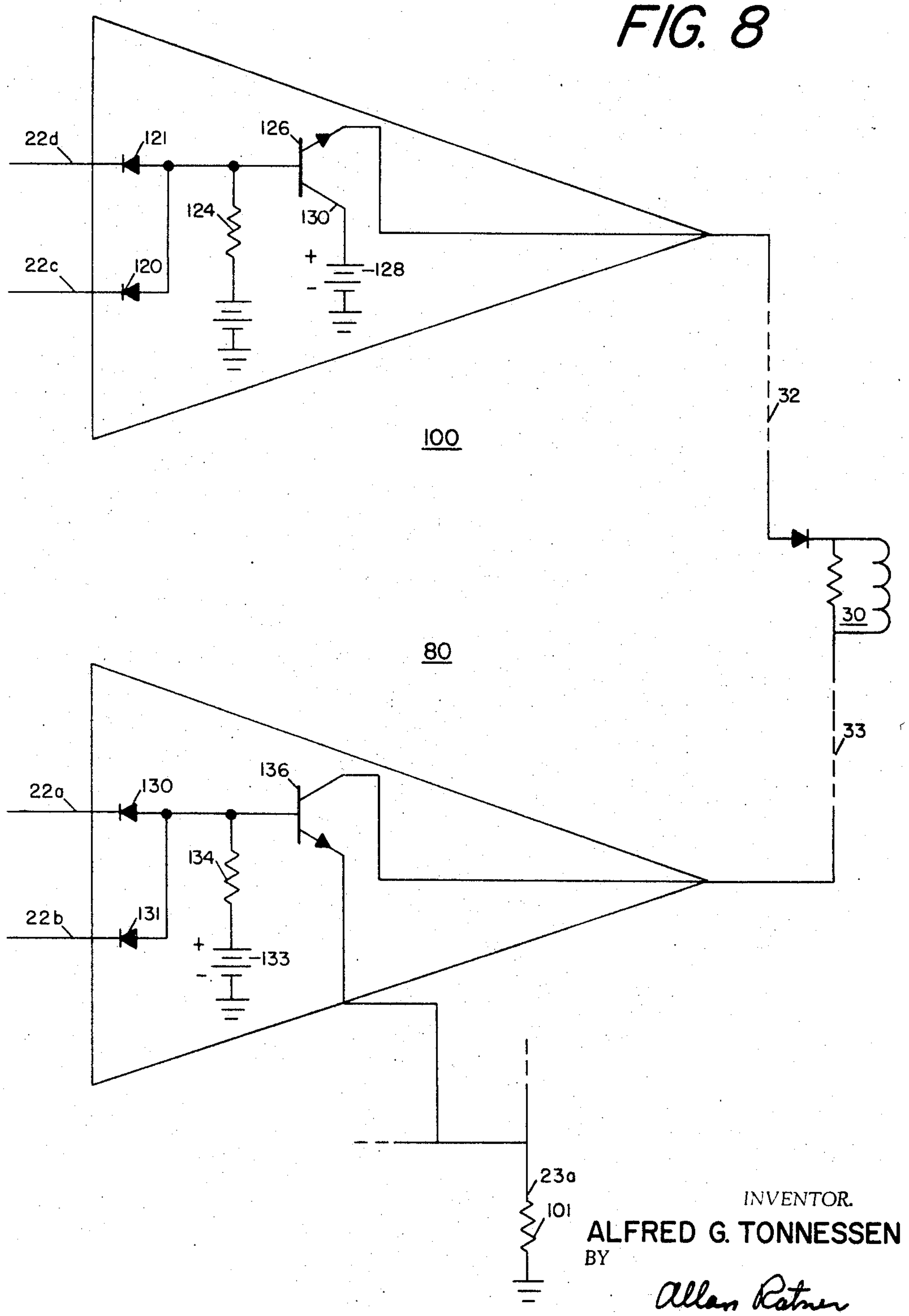

FIG. 8 schematically illustrates energizing circuits shown in FIGS. 4 and 5.

Figure 1B:
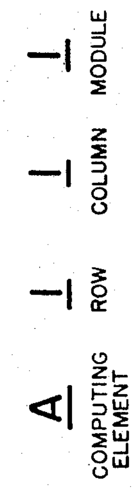
FIG. 1B illustrates a sample address.
Figure 1:
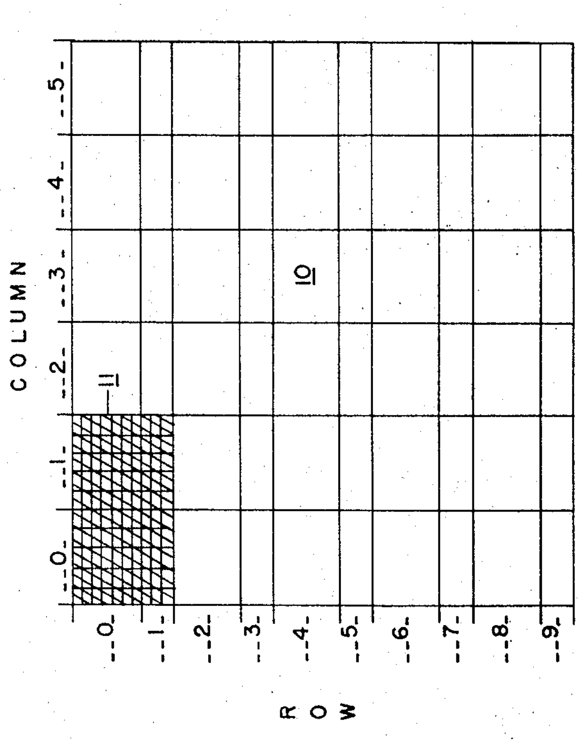
FIGS. 1 and 1A illustrate an analog patchboard.
Figure 1A:
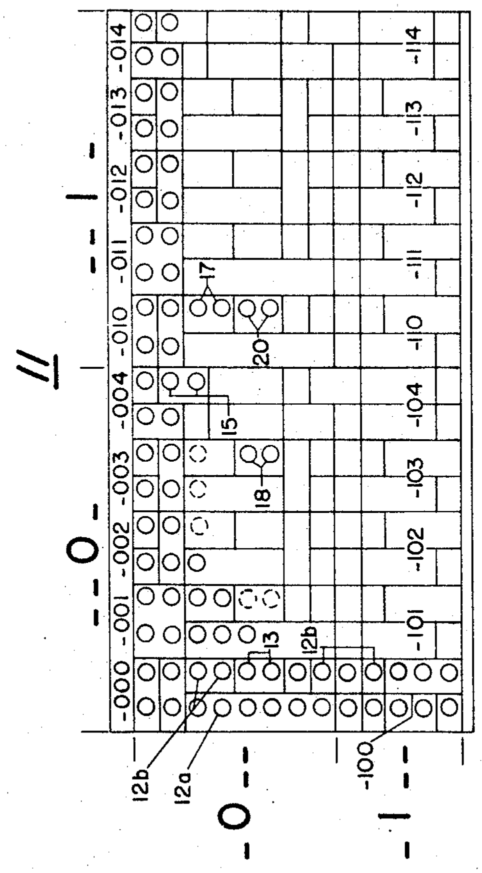

Referring now to FIG. 1, there is shown an analog patchboard 10 having a position oriented addressing system with only a representative portion 11 thereof shown in detail in FIG. 1A. Patchboards or patchbays are well known in the art and are described for example in Korn and Korn, Electronic Analog and Hybrid Computers, McGraw-Hill, 1964 at p. 439 et seq. Patchboard 10 has six columns 0–5 and ten rows 0–9 and comprises a plurality of holes, each connected to a different computing element of the analog computer. Only a representative number of holes have been illustrated in FIG. 1A. In order to provide a substantially symmetrical grouping of the holes the components are assigned particular addresses to correspond with the orientation of the patchboard. The address of each analog element is comprised of an address having four characters, as for example A111. As shown in FIG. 1B the first character is an alphabetic character and indicates the type of computing element, as for example, "A" for amplifier, "P" for potentiometer, "F" for function generator, "T" for trunk, "C" for coefficient, "M" for multiplier, "N" for squarer, "K" for function relay and "R" for resolver. The second character of the address indicates the row of the computing element, the third character of the address indicates the column of the computing element and the fourth character of the address indicates a particular module. It will be noted that at an address having a predetermined row and column, there may be a plurality of modules as for example, at row 0, column 0, there are five modules having addresses of _000, _001, _002, _003, and _004. Each of the modules comprises one or more computing elements and the specific computing element at the address of the module is determined by the first character of the address. Thus, at **12*a* and 12*b* there are holes indicating the inputs and outputs respectively of an amplifier having an address A000. At 13, there are two holes corresponding to a potentiometer having an address P000**.

While the foregoing position oriented addressing system is convenient for the computer operator, the numbering system is not continuous. For example, it will be seen that amplifier A004 in column 0 row 0 having outputs indicated by reference character 15, is followed in sequence by an amplifier having outputs 17 at A010 in column 1, number 1. In addition, it will also be seen that potentiometer having holes 18 at address P003 is followed by a potentiometer having holes 20 at address P010. In addition, while holes are provided for a predetermined maximum number of computing elements, such computing elements may not be connected in the computer, as they may be being repaired, or the analog computer may not contain the maximum number of computing elements.

Thus, an important requirement in an analog computer is a scanning system which scans the outputs of each of the computing elements at the differing addresses and only performs a readout, as for example, by a printer, at addresses at which computing elements are actually located. If a computing element is not connected at a particular address, a readout will not be taken because such a readout would be an "invalid" readout.

The taking of a readout of a single computing element is illustrated, for example, in FIG. 2 for a computing element located at address A000. The computing element at A000 comprises amplifier 25 disposed within a tray 26 connected to a connector 27. In addition, there is further provided within tray 26 a readout relay 30 having relay coil **30*a* connected in series circuit relation with a diode 31. Conductors 32 and 33 of the series circuit are connected by way of connector 27 to predetermined relay matrix drive lines and to gates in a gating system 23**.

It will be understood that relay 30 of computing element 25 is one of a plurality of relays with each relay associated with a different computing element and all located within a relay matrix 21. Each of the relays within the matrix 21 are connected to differing ones of the gating circuits in the gating system 23 in a manner later to be described. In order to provide for the sequential energization of each of the relays 30 within the matrix or array 21 to produce the sequential readout of the computing elements of a computer, the switching system of the present invention basically comprises a decade counter 20, and a decoder 22 which controls a gating system 23. For example, when the counter 20 produces a signal corresponding to address A000 the gating system 23 applies a signal to that address by way of relay matrix drive lines 32 and 33. That address is a valid address since a relay 30 is disposed at that address, and the signals on lines 32 and 33 energize relay 30 thereby to shift a movable contact **30*b* of relay 30 to engage a fixed contact 30*c*. In this manner the output of amplifier 25 is applied by way of the movable contact 30*b*, fixed contact 30*c*, conductor 35 and to a common bus conductor 36 to an input of a digital voltmeter 38. Accordingly, digital voltmeter 38 displays and reads the voltage output of amplifier 25 located at address A000. Voltmeter 38 is normally inhibited by way of an inhibit input conductor 39** during the time that the system scanning occurs and is uninhibited only during the time that a valid address is being read which will later be described in detail.

The digital voltmeter produces a digital output corresponding to the voltage output of amplifier 25 which is applied by way of a cable 41 to a printer 42. Printer 42 not only prints the digital equivalent of the voltage output of amplifier 25 but also prints the address of amplifier 25 which is received from decade counter 20. In addition, printer 42 provides an output by way of a conductor 44 to a scanning control 24 which signal indicates that a valid address has been printed. In addition, the scan control 24 receives an input from gating system 23 by way of a conductor **23*a* at the time relay 30 at address A000 has been energized indicating a valid address. Upon application of the two signals on conductors 44 and 23*a*, the scanning control 24 produces an energizing pulse by way of a conductor 24*a* to the decade counter 21 to switch that counter to produce the next subsequent address in the series. This next address is applied to decoder 22 which is effective to produce from gate 23 an energizing signal to a relay 30 at the next address A001**.

If address A001 is a valid address, i.e., a relay 30 is located at that address, then the foregoing operation is then repeated with a readout taken by meter 38 and printer 42. However, if a relay is not located in that address, a signal is produced on conductor **23*a* indicating an invalid address. As a result the clock signal is effective to produce an energizing pulse from control 24 which is applied by way of conductor 24*a* to again energize the decade counter 20 to step to the next address. It will be understood that during the time of scanning that the control 24 produces inhibiting signal by way of conductor 39 to prevent the voltmeter 39** from making an erroneous reading.

In accordance with the invention, there is provided sequential addressing of computing elements in which if a computing element is located at an address, i.e., a relay is located at that address in the matrix 21, an output is read out of that computing element. On the other hand, if a computing element is not located at an address, no output is produced and the foregoing operation is performed sequentially through all of the addresses of the computing elements.

The circuit elements of FIG. 2 will now be described in detail as shown in FIGS. 3–6.

Decade counter 20 comprises 16 flip-flops 51*a*–51*d*, 52*a*–52*d*, 53*a*–53*d* and 54*a*–54*d*. In this manner, there are four groups of four flip-flops with each group representing a different character of the address. Specifically, the group of flip-flops 51*a*–51*d* corresponds to the fourth character representing the module; the group 52*a*–52*d* corresponds to the third character representing the column; the group 53*a*–53*d* corresponds to the second character representing the row; and, the group 54*a*–54*d* corresponds to the first character of the address representing the computing elements. The groups of flip-flops are interconnected and include gating circuits so that each group counts to a decade in the manner described in "Pulse and Digital Circuits" by Millman and Taub, McGraw Hill, 1956, at page 330, et seq. It will be understood that each group may count to less than a decade, if less than ten outputs are required.

As shown in FIG. 7, input count pulses on conductor 24*a* are applied to an input of a first flip-flop 51*a* and the interval between count pulses may vary as the pulses are produced by control 24, though for illustrative purposes they have regular time intervals. As a result of the input pulses to flip-flop 51*a*, there is produced by way of conductor 60*a* a level change or pulse for each pulse input on conductor 24*a*. These signals are applied to a trigger input of flip-flop 51*b* which produces signals on output conductor 61*a*, a single pulse for every two pulses produced on conductor 60*a*. Conductor 61*a* is connected to the trigger input of flip-flop 51*c* which produces on output conductor 62*a* signals of half the frequency on conductor 61*a* as shown in FIG. 7. The signals on conductor 62*a* are applied to a trigger input of flip-flop 51*d* and, as a result of the connections for decade counting, flip-flop 51*d* is set at the termination of the pulse on conductor 62*a* and is reset at the termination of the tenth count or pulse on conductor 24*a*. In this manner, at the end of the tenth count, all of the module counter flip-flops 52*a*–52*d* are in their reset of "0" state.

The signals on output conductor 63*a* of flip-flop 51*d* are applied to the flip-flop 52*a* and operate as count pulses for the column counter flip-flop group 52*a*–52*d*. These flip-flops count to a decade in a manner similar to that described with respect to flip-flops 51*a*–51*d*. Accordingly, for each decade count of flip-flops 51*a*–51*d*, the flip-flops 52*a*–52*d* make a single count. At the end of its decade count, a signal is produced by way of conductor 63*b* from flip-flop 62*d* which is applied to a trigger input of flip-flop 53*a* and operates as a count signal for the row counter group 53*a*–53*d*. In similar manner, an output 63*c* is taken from an output of flip-flop 53*d* and is applied to a trigger input of flip-flop 54*a* and operates as a count signal for computing element counter group 54*a*–54*d*. Thus, it will now be understood that the four groups of flip-flops count by decades with the first group 51*a*–51*d* counting the unit digits, group 52*a*–52*d* counting the ten digits, group 53*a*–53*d* counting the hundreds digits, and the group 54*a*–54*d* counting the thousands digit. The output of the last flip-flop 54*d* is applied to an indicator 68 which designates that the count has been completed, and in addition is effective to reset all of the counters.

The outputs of the flip-flops 51*a*–51*d* are applied by way of a cable 70 to a module decoder 22*a* which includes a matrix of the type well known in the art to produce an output indicative of the decade count of group 51*a*–51*d*. More particularly, decoder 22*a* produces an energization (positive-going) signal (1) on the output line 0 when the count corresponds to a decimal count of "0"; (2) on output line 1 when the decimal count corresponds to a decimal count of "1," etc. The output lines 0–9 of decoder 22*a* are applied to one of two inputs of differing ones of Y-gates 80 later to be described in detail. Specifically, the 0 line is applied by way of conductor 71 to one input of a plurality of Y-gates corresponding to module 0. The 1 output line of decoder 22*a* is applied by way of a conductor 72 to one input of a plurality of Y-gates 80 corresponding to module 1, etc. The Y gates 80 comprise substantially half of the gating system 23 and are designated 23*b*.

In order to provide the remaining energization signal for the gates 80, the outputs of the flip-flop group 53*a*–53*d* is applied by way of a cable 82 to the row decoder 22*b*. In a manner similar to that described for the module decoder 22*a*, the row decoder 22*b* produces an energizing (positive-going) output on output lines 0–9 corresponding to the decimal signals produced by the flip-flop group 53*a*–53*d*. It will be noted that the 0 line of decoder 22*b* is applied by way of a conductor 85 to the Y-gates corresponding to row 0, the 1 output of decoder 22*b* is applied by way of conductor 86 to the Y-gates corresponding to row 1, etc. At any one time only one line of the decoder 22*a*, and only one line of decoder 22*b* are energized to select a single Y-gate 80 at the intersection of the energized lines. The selected Y-gate provides an output signal by way of a relay matrix drive line 33.

Coming now to the circuits for energizing the remaining half of the gating system 23 vis., system 23*c*, it will be seen that a column decoder 22*c* is energized by way of a cable 90 connected to the outputs of the column counter group 52*a*–52*d*. Accordingly, the column decoder 22*c* produces signals on its outputs 0–9 corresponding to the decimal equivalent of the signals produced by the flip-flops 52*a*–52*d*. Specifically, a 0 output energizing (positive-going) signal is produced by way of conductor 91 to X-gates 100 corresponding to column 0. An energizing signal from decoder 22*c* on a 1 output is applied by way of conductor 92 to X-gates corresponding to column 1, etc. In order to provide the remaining input for X-gates 100, there is provided a computing element or component decoder 22*d* connected by way of a cable 95 to the outputs of computing element counter group 54*a*–54*d*. Decoder 22*d* produces outputs on its respective conductors corresponding to the decimal equivalent of the signals produced by flip-flop 54*a*–54*d* so that an energizing (positive-going) signal is produced on conductor A having a decimal equivalent equal to zero; an energizing signal is produced on conductor F corresponding to a decimal equivalent of 1, etc.

With the above understanding, it will now be clear that for any one count in the decade counter 20, row decoder 22*b* and module decoder 22*a* are effective to select or enable only one Y-gate 80 to produce an output signal from that particular gate by way of a single relay matrix drive line 33. In similar manner, at that particular time, column decoder 22*c* and computing element decoder 22*d* are effective to select a single X-gate 23*c* to produce energizing signals on only one relay matrix drive line 32. In this manner, with a particular line 32 energized and a particular line 33 energized, only a single relay 33 is selected and actuated if a relay does exist at that address. For example, if an amplifier at address A010 is to be selected, then X-gate 100*a* is energized to produce an energizing signal on line 32*b* and Y-gate 80*a* is energized to produce an energizing signal on line 33*a*. In this manner relay 30 at address A010 is actuated. As will later be described in detail, upon actuation of a relay at a valid address, an additional output is produced from the corresponding energizing Y-gate by way of conductor 23*a* and resistor 101 to ground. In this manner, with a valid address chosen and a relay energized, a potential drop is produced across resistor 101. On the other hand, when a relay is not at the selected address, then a potential drop is not produced across resistor 101.

With a valid address and a potential drop across resistor 101, an input signal is applied to a comparator 102 of the control circuit 24 which produces an inhibit signal at an output 102*a* which is applied to "AND" gate 105 to inhibit that gate. In this manner, inhibited "AND" gate 105 does not produce an output signal upon application of a clock pulse to an additional input of that gate. The output of the "AND" gate is applied to one input of an "OR" gate 108, the output of which is the output of the control circuit 24, i.e., output 24*a*. Accordingly, as previously described, when a valid address is reached, a period of time must be taken for the meter 38 and printer 42, FIG. 2, to produce readouts. Thus, with gate 105 inhibited, the decade counter is prevented from being energized to continue its count until a signal is received from printer 42. After printer 42 produces a printout, it provides an output signal by way of conductor 44 to the other input of "OR" gate 108 and is effective to generate a count pulse to set the decade counter 21 to the next subsequent count.

It will be understood that with an invalid address and a relay coil not located at a selected address, that the comparator 102 produces an energizing signal by way of conductor 102*a* to enable the "AND" gate 105. Thus a clock pulse is applied by way of enabled gate 105 to "OR" gate 108 to step the decade counter 21 to the next address. If that address is an invalid address, the previous operation will continue until a valid address is reached and the decade counter will remain at that address until the readout is taken and an output signal is produced by printer 42. It is in this way that sequential scanning is provided in accordance with the invention.

In order to provide modes of operation other than the above-described sequential scanning of the relays 30, there is provided a keyboard 110 and a gating system 111. Keyboard 110 may be a 10-key serial input keyboard well known in the art in which a particular four-character address may be manually entered. In this mode of keyboard selection operation, the four groups of flip-flops are utilized as a storage device only, rather than a counting device. Specifically, an address is entered manually in the keyboard 110 and is applied to the gating system 111 which includes a four-bit shift register. The shift register directs the keyboard data first into the computing element counter group 54*a*–54*d* by way of conductors 114*a*–114*d* connected to the set terminals respectively of flip-flops 54*a*–54*d*. Conductor 114*e* is connected to each of the reset terminals of these flip-flops. In this manner, gating system 111 resets all flip-flops 54*a*–54*d* and then sets these flip-flops in accordance with the computing element address entered in keyboard 110. After the computing element or component address is set, the shift register of circuit 111 steps to the row counter group, resets the flip-flops 53*a*–53*d*, and then sets the flip-flops in accordance with the row entered in keyboard 110. In similar manner, the shift register then steps to the column counter group to reset the corresponding flip-flops 52*a*–52*d* and sets them in accordance with the column entered in keyboard 110, and then shifts to the module counter group 51*a*–51*d* to reset and set the flip-flops to the address of the module entered in keyboard 110.

It will now be understood that a particular address may be set in keyboard 110 and the relay at that address will be energized to read out the corresponding computer element. If a relay is not located at that address, an error signal is produced which indicates an invalid address has been selected. Those skilled in the art will understand that in place of keyboard 110 a digital computer may be utilized to be programmed and to read in desired addresses automatically.

During the foregoing keyboard operation, switch 115 is open so that "AND" gate 105 is inhibited and the above-described scanning operation does not take place. However, during the scanning operation, the switch 115 is maintained in its illustrated closed position so that "AND" gate 105 operates under the control of the clock pulses and the output of comparator 102.

Referring now to FIG. 8, there is shown in detail the circuitry of gates 80 and 100. Each of the gates 100 has one input connected to the column decoder 22*c* and one input connected to the computing element decoder 22*d* which inputs are connected by way of diodes 120 and 121 respectively to the base of transistor 126. Diodes 120 and 121 provide a logical "AND" function so that if both inputs are positive-going these diodes are rendered nonconductive. With both diodes nonconductive a circuit may be traced from the positive side of a battery 123 through resistor 124 to the base of transistor 126, to render that transistor conductive. With transistor 126 rendered conductive, a collector current circuit may be traced by way of a positive side of a battery 128, conductor 130, and then by way of the collector, base, and emitter of conductive transistor 126 to the relay matrix conductor 32 to provide a current for flow through a selected relay circuit 30 in manner previously described.

However, the circuit through the relay 30 is not completed unless a gate 80 is also actuated by its two inputs from a row decoder 22*b* and a module decoder 22*a*. Gate 80 is actuated when positive-going signals are applied to its diodes 130 and 131. At that time, a conductive biasing circuit may be traced from the positive side of a battery 133 through a resistor 134 to the base of a transistor 136 rendering that transistor conductive. Therefore, a relay 30 energizing circuit is completed by way of gate 100, relay matrix conductor 32, relay 30, relay matrix conductor 33, the collector, base, and emitter of transistor 136, conductor 23*a* and then through resistor 101 to ground. In this manner, battery 128 is effective to provide a current for flow through relay 30 and resistor 101 to produce a potential drop across that resistor to provide an energizing signal to comparator 102 of FIG. 5.

It will be understood that if either or both of the signals applied to diodes 120 and 121 are in a negative-going direction, then transistor 126 is rendered nonconductive and an energizing current is not provided for relay 30. In similar manner, if either or both of the signals applied to diodes 130 and 131 are in a negative-going direction, transistor 136 is rendered nonconductive, thereby opening the energizing circuit for relay 30. It will now be understood that the plurality of gates 100 and the plurality of gates 80 are effective to energize differing ones of the relays 30. If a relay 30 is not located in circuit between the energized gates 100 and 80, then the circuit is not completed and the energizing current does not flow through resistor 101 producing a zero output signal to the comparator 102.

While I have described but one embodiment of my invention, it will be clear to those skilled in the art that other embodiments within the scope of the subjoined claims may be employed.

What is claimed is:

1. A scanning readout system comprising a computer having a plurality of computing elements located at predetermined addresses therein, addressing means for producing address signals corresponding to a sequence of addresses, matrix means having a plurality of intersections corresponding to said sequence of addresses, means connecting each said computing element to said matrix means each at its respective address, operating means connected to said addressing means and to said matrix means for applying operating signals to sequentially select each of said addresses of said matrix means to read out the outputs of computing elements with a readout taken only if a computing element is located at a selected address, and control means connected to said operating means (1) for providing a time duration for said readout and thereafter stepping said addressing means to the next sequential address when a computing element is located at a selected address, and (2) for stepping means to the next sequential address when a computing element is not located at a selected address.

2. The scanning system of claim 2 in which said matrix means includes relay means corresponding to a computing element and operable to connect the output of said corresponding computing element to a readout device, and said operating means includes a plurality of pairs of transistors with each pair energizing a predetermined one of said relay means.

3. The scanning system of claim 2 in which there is provided resistance means connected to said operating means for providing a potential drop only when a computing element is located at a selected address, and in which said control means includes gating means responsive to said potential drop for stepping said addressing means to the next sequential address when a potential drop is not produced and for preventing said stepping when a potential drop is produced.

4. The scanning system of claim 3 in which there is provided a readout device adapted to be sequentially connected to the output of said selected computing elements and for providing an output signal for application to said control means for stepping said counter means only after a readout has been taken when a potential drop is produced across said resistance means.

5. A sequential scanning system comprising, in combination, an analog computer having a plurality of analog computing elements located at predetermined addresses therein counter means for producing address signals corresponding to a predetermined sequence of addresses, array means having a plurality of intersections corresponding to said predetermined sequence of addresses and having relay means connected to said array means each at an address corresponding to the position of a respective computing element, energizing means responsive to said address signals and connected to said array means for applying energizing signals sequentially to each of said predetermined addresses of said array means, and control means connected to said energizing means (1) for reading out the output of a computing element at a selected address and thereafter to step said counting means to the next sequential address when a corresponding relay means is located at that selected address and is energized and (2) for stepping said counting means to the next sequential address when a relay means is not located at a selected address and is not energized.

6. The scanning system of claim 5 in which said counter means includes a plurality of flip-flop circuits connected in groups with each group connected to count to a decade and individual decoder means connected to each decade group of flip-flop circuits and having a plurality of outputs connected to said array means with each output corresponding to a differing one of a decade count.

7. The scanning system of claim 5 in which each of said relay means includes a relay operable to connect the output of its corresponding computing element to a readout device, and said energizing means includes a plurality of pairs of transistors with each pair having circuits for energizing a predetermined one of said relays.

8. The scanning system of claim 5 in which there is provided a resistor connected to said energizing means for providing a potential drop only when a computing element is located at a selected address, and in which said control means includes gating means responsive to said potential drop for stepping said counter means to the next sequential address when a potential drop is not produced and for preventing said stepping when a potential drop is produced.

9. The scanning system of claim 8 in which there is provided a readout device for providing an output stepping signal for application to said control means for stepping said counter means only after the time duration of a readout only when a potential drop is produced across said resistor.

10. A scanning system comprising a computer having a plurality of computing elements located at predetermined addresses therein.

means for producing address signals corresponding to a sequence of addresses, matrix means having a plurality of intersections corresponding to said sequence of addresses and having said computing elements connected to said matrix means each at its respective address, means responsive to said address signals and connected to said matrix means for applying an operating signal sequentially to each of said intersections of said matrix means, and control means connected to said energizing means (1) when a corresponding computing element is located at a selected address for reading out the output of a computing element at that address and thereafter stepping said counting means to the next sequential address, and (2) when relay means is not located at a selected address for stepping said counting means to the next sequential address.

11. The scanning system of claim 10 in which said address signal means includes a plurality of flip-flop circuits connected in groups with each group counting to a decade, and individual decoder means connected to each group of flip-flop circuits having a plurality of outputs each connected to said matrix means with each of said outputs corresponding to a differing one of said decade count.

12. A system for sequentially scanning a plurality of computing elements in a computer to read out computing elements on a readout device only at selected addresses at which a computing element is located comprising a plurality of computing elements, counter means for producing address signals corresponding to a sequence of addresses, each of said computing elements including relay means operable to connect the output of its corresponding computing element to said readout device, means connected to differing ones of said relay means forming a matrix with differing intersections of the matrix corresponding to differing ones of said addresses, energizing means connected between said counter means and said matrix means for sequentially applying to each address in said matrix each corresponding to a differing address a signal for energizing relay means located at selected addresses, and control means connected to said energizing means and to said readout device and responsive to the application of each energization signal (1) for inhibiting said readout device from producing an output and for stepping said counting means to the next sequential address when relay means is not located at a selected address and (2) for permitting said readout device from producing an output and thereafter to step said counting means to the next sequential address when relay means is located at a selected address.

13. The scanning system of claim 12 in which there is provided a resistor connected in circuit with said energizing means for providing a potential drop only when a computing element is located at a selected address, and in which said control means includes gating means responsive to said potential drop for stepping said counter means to the next sequential address when a potential drop is not produced and for preventing said stepping when a potential drop is produced.

14. The scanning system of claim 13 in which said readout device includes a printer for providing an output stepping signal for application to said control means for stepping said counter means only after the time duration of a printout only when a potential drop is produced across said resistor.

15. A system for sequentially scanning a plurality of computing elements in a computer to read out computing element outputs on a readout device only at addresses at which a computing element is located comprising a plurality of computing elements, counter means for producing address signals corresponding to a sequence of addresses, a plurality of relay means each corresponding to a different computing element operable to connect the output of its corresponding computing element to said readout device, array means having at least two groups of drive line conductors with one of said group of conductors crossing the other of said group of conductors forming intersections of the array with each intersection corresponding to a differing one of said addresses, means connecting predetermined ones of said relay means at differing intersections of said array, energizing means connected to said counter means and to said array means for sequentially applying energizing signals to each of said addresses of said array means for energizing relay means located at the selected addresses, and control means connected to said energizing means (1) for providing a predetermined time duration for said readout and thereafter stepping said counter means to the next sequential address when a computing element is located at a selected address, and (2) for immediately stepping said counter means to the next sequential address when a computing element is not located at a selected address so that a readout is not taken at that address.

16. The sequential scanning system of claim 15 in which said energizing means includes a plurality of first circuits connected in groups with each group interconnected to count to a decade and said energizing means comprising individual decoder means connected to each decade group of flip-flop circuits and having a plurality of decoder outputs with each output corresponding to a differing one of a decade counter, and means connecting said decoder outputs each to a differing one of said drive line conductors.

17. The sequential scanning system of claim 15 in which said energizing means includes a plurality of first transistor-energizing circuits for said one group of drive line conductors and a plurality of second transistor-energizing circuits for said other group of drive line conductors, means connecting each of said second transistor circuits to resistance means whereby an energizing signal is applied by way of a first transistor circuit through a selected relay means and through a second transistor circuit to provide a potential drop across said resistance means when a computing element is located at said selected address.

18. The sequential scanning system of claim 17 in which said control means includes comparator means connected to said resistance means to provide a signal to step said counter means when a potential drop is not produced and to provide a signal to prevent said stepping when a potential drop is produced.

References Cited

UNITED STATES PATENTS

| | | | |
|---|---|---|---|
| 3,231,723 | 1/1966 | Gilliland et al. | 235—150.4 |
| 3,243,582 | 3/1966 | Holst | 235—150.4 |
| 3,274,561 | 9/1966 | Hallman et al. | 340—172.5 |
| 3,287,703 | 11/1966 | Slotnick | 340—172.5 |
| 3,302,183 | 1/1967 | Bennett et al. | 340—172.5 |
| 3,337,848 | 8/1967 | Lowry | 340—166 |

MARTIN P. HARTMAN, *Primary Examiner.*

U.S. Cl. X.R.

235—150.5; 340—172.5, 166